(12) United States Patent
Tanji (10) Patent No.: US 8,363,246 B2
(45) Date of Patent: Jan. 29, 2013

(54) COMMUNICATION CONTROL APPARATUS COMMUNICATABLE WITH AN EXTERNAL APPARATUS AND A CONTROLLER, AND A METHOD OF CONTROLLING THE COMMUNICATION CONTROL APPARATUS

(75) Inventor: Masamichi Tanji, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1023 days.

(21) Appl. No.: 11/778,892

(22) Filed: Jul. 17, 2007

(65) Prior Publication Data

US 2008/0024819 A1    Jan. 31, 2008

(30) Foreign Application Priority Data

Jul. 28, 2006    (JP) .................................. 2006-207174

(51) Int. Cl.
*G06F 3/12* (2006.01)
(52) U.S. Cl. .................... 358/1.15; 713/153; 713/163

(58) Field of Classification Search ............. 358/11–2.1
See application file for complete search history.

(56) References Cited

U.S. PATENT DOCUMENTS

| | | | |
|---|---|---|---|
| 6,747,979 B1 * | 6/2004 | Banks et al. .................. | 370/401 |
| 6,895,443 B2 * | 5/2005 | Aiken ........................... | 709/245 |
| 2002/0144023 A1 * | 10/2002 | Kawabuchi et al. ............. | 710/5 |
| 2005/0015498 A1 * | 1/2005 | Okazawa et al. ............. | 709/227 |
| 2006/0224774 A1 * | 10/2006 | Tanji ........................... | 709/245 |

\* cited by examiner

*Primary Examiner* — Benny Q Tieu
*Assistant Examiner* — Marcellus Augustin
(74) *Attorney, Agent, or Firm* — Cowan, Liebowitz & Latman, P.C.

(57) ABSTRACT

Address information is requested of a data processing apparatus upon receiving, from the data processing apparatus, data to be transmitted to a network in order to confirm whether an external apparatus is using a specific address. The address information transmitted from the data processing apparatus in response to the request is registered in a communication control apparatus.

15 Claims, 7 Drawing Sheets

COMMUNICATION CONTROL APPARATUS COMMUNICATABLE WITH AN EXTERNAL APPARATUS AND A CONTROLLER, AND A METHOD OF CONTROLLING THE COMMUNICATION CONTROL APPARATUS

BACKGROUND OF THE INVENTION

1. Field of the Invention

The present invention relates to a communication control apparatus which is connectable to a data processing apparatus and is typified by a network card device, the data processing apparatus, and a control method therefor.

2. Description of the Related Art

There has been proposed a method using an intelligent network card device which is connectable to a printing apparatus and has desired optional functions for it.

In this case, the printing apparatus main body and the network card device are intelligent both with CPUs. In general, the network card device has a print server function of performing overall control of various print services via a network. The printing apparatus and the network card device communicate with each other via a connection interface to implement a desired service.

As a feature, the network card device communicates with a communication terminal on a network by using the same network address (e.g., IP address) as that of the printing apparatus. This means that a communication terminal on the network recognizes the printing apparatus and the network card device as one communication terminal on the network. The network card device can provide a service such as the print server function as if the service was added to the printing apparatus main body.

The network card device and the printing apparatus use a network protocol such as TCP/IP in communicating with an external apparatus on a network. Recently, the IETF (Internet Engineering Task Force) has proposed IP version 6 (to be referred to as IPv6 hereinafter) as a network layer protocol used in TCP/IP communication. IPv6 expands the IP address space from the currently pervading IP version 4 (to be referred to as IPv4 hereinafter). IPv6 copes with the shortage of global addresses along with rapid expansion of the Internet world.

The IPv6 protocol has a link-local address automatically generated by concatenating an interface identifier generated from an IEEE identifier (MAC address) to a specific network prefix. The IPv6 protocol also has a stateless address generated by concatenating an interface identifier generated from an IEEE identifier (MAC address) to a network prefix advertised from a router. Further, the IPv6 protocol has a stateful address designated from DHCP.

The IPv6 protocol can assign these network addresses to one physical interface. The network address may be added or changed at any time during activation in accordance with manual settings from a user or an advertisement from a router.

When the printing apparatus and the network card device are compatible with the IPv6 protocol, a mechanism which allows them to always use the same network addresses is necessary.

As a conceivable means for this, the printing apparatus notifies the network card device of a new network address by a predetermined means every time the printing apparatus obtains or generates the new network address.

However, when viewed from the printing apparatus, the network card device is not always mounted in the connection interface of the printing apparatus. As the mounted network card device, various types of network card devices exist. For example, a network card device having only the physical layer in the network protocol does not require any network address, and may not have a means for receiving a network address from the printing apparatus.

In the above-described method, the printing apparatus must determine whether any network card device is mounted in the connection interface of the printing apparatus. If a network card device is mounted, the printing apparatus must determine the type of the mounted network card device. Only when the mounted network card device requires a network address, the printing apparatus actually notifies it of a network address.

The network card device is provided as an expansion option of the printing apparatus. Despite this, the printing apparatus recognizes the type of network card device and the like, and operates in accordance with the type. This means that, every time a new network card device is introduced, the printing apparatus must individually deal with it, which is not desirable.

As another conceivable means, the network card device always monitors communication between the printing apparatus and a communication terminal on a network, and extracts the network address of the printing apparatus from header information of a communication packet.

According to this method, even when the printing apparatus starts using a new network address, the network card device can obtain the network address without making the printing apparatus aware of this. The printing apparatus therefore need to neither determine the type of network card device nor perform any process.

According to this method, however, if the value of a given network address changes to a different one in the printing apparatus, the network card device cannot recognize the change.

Assume that, of network address A and network address B assigned to the printing apparatus, network address A changes to network address C. In this case, the network card device cannot determine whether network address C is newly added or has changed from network address A.

As one means for solving these problems, the printing apparatus obtains or generates a network address, and the network card device inquires the network address of the printing apparatus by a predetermined method, as needed. An inquiry method can, e.g., be a method using MIB (Management Information Base). The printing apparatus has the MIB agent function, and the network card device has the MIB client function.

The network card device inquires network address information of the MIB agent of the printing apparatus, and uses all obtained network addresses as network addresses of the network card device. This method obviates the need for the printing apparatus to determine the type of network card device and perform any process. Even when the value of a given network address changes in the printing apparatus, the network card device can recognize the change.

However, even this method suffers new problems as follows.

As described above, a network address may always be added or changed in the IPv6 protocol. When the above-mentioned means is employed, the network card device must always keep inquiring network address information of the printing apparatus every predetermined period during activation.

More specifically, the network card device obtains all network addresses by an inquiry means such as MIB from the printing apparatus every predetermined period, and determines whether the network addresses have not changed from previously obtained information. If the network card device determines that the network addresses have changed, it sets new address information as network addresses of the network card device itself. The network card device must repeat this process.

Repetitive execution of this process during activation imposes a heavy work burden on both the network card device and the printing apparatus. In an environment where address settings do not so frequently change, most inquires are unnecessary and redundant in many cases.

SUMMARY OF THE INVENTION

The present invention has been made to overcome the conventional drawbacks, and has as its object to provide a technique of reducing process loads on a data processing apparatus and a communication control apparatus connected to it in order to share network addresses between them.

According to one aspect of the present invention, a communication control apparatus which communicates data with an external apparatus via a network, comprising:

a holding unit adapted to hold a network address which is assigned to the communication control apparatus and used in communicating with the external apparatus via the network;

a request unit adapted to request, of a data processing apparatus connected to the communication control apparatus, network address information representing a network address assigned to the data processing apparatus upon receiving, from the data processing apparatus, data to be transmitted to the network in order to confirm whether the external apparatus is using a specific network address; and a registration unit adapted to register, in the holding unit, the network address represented by the network address information transmitted from the data processing apparatus in response to the request.

According to another aspect of the present invention, a system including a communication control apparatus and a data processing apparatus, wherein, the communication control apparatus comprises:
  a first holding unit adapted to hold a network address which is assigned to the communication control apparatus and used in communicating with an external apparatus via a network;
  a request unit adapted to request, of the data processing apparatus, network address information representing a network address assigned to the data processing apparatus upon receiving, from the data processing apparatus, data to be transmitted to the network in order to confirm whether the external apparatus is using a specific network address; and
  a first registration unit adapted to register, in the first holding unit, the network address represented by the network address information transmitted from the data processing apparatus in response to the request, and the data processing apparatus comprises:
  a second holding unit adapted to hold the network address which is assigned to the data processing apparatus and used in communicating with the external apparatus via the network;
  a first transmission unit adapted to transmit the data to the communication control apparatus in order to transmit the data to the network;
  a second registration unit adapted to register the specific network address in the second holding unit when the external apparatus does not send back data representing that the external apparatus is using the specific network address, after the data is transmitted to the network; and
  a second transmission unit adapted to transmit network address information representing a network address held in the second holding unit to the communication control apparatus upon receiving the request from the communication control apparatus.

According to another aspect of the present invention, a method of controlling a communication control apparatus which communicates data with an external apparatus via a network, comprising:

a request step of requesting, of a data processing apparatus connected to the communication control apparatus, network address information representing a network address assigned to the data processing apparatus upon receiving, from the data processing apparatus, data to be transmitted to the network in order to confirm whether the external apparatus is using a specific network address; and a registration step of registering the network address represented by the network address information transmitted from the data processing apparatus in response to the request, as a network address which is assigned to the communication control apparatus and used in communicating with the external apparatus via the network.

According to another aspect of the present invention, a method of controlling a system including a communication control apparatus and a data processing apparatus, comprising:

a request step of requesting, of the data processing apparatus, network address information representing a network address assigned to the data processing apparatus when the communication control apparatus receives, from the data processing apparatus, data to be transmitted to a network in order to confirm whether an external apparatus is using a specific network address;

a first registration step of registering the network address represented by the network address information transmitted from the data processing apparatus in response to the request, as a network address which is assigned to the communication control apparatus and used when the communication control apparatus communicates with the external apparatus via the network;

a first transmission step of transmitting the data from the data processing apparatus to the communication control apparatus in order to transmit the data to the network;

a second registration step of, when the external apparatus does not send back data representing that the external apparatus is using the specific network address, after the data is transmitted to the network, registering the specific network address as the network address which is assigned to the data processing apparatus and used when the data processing apparatus communicates with the external apparatus via the network; and a second transmission step of transmitting network address information representing the network address assigned to the data processing apparatus from the data processing apparatus to the communication control apparatus when the data processing apparatus receives the request from the communication control apparatus.

Further features of the present invention will become apparent from the following description of exemplary embodiments with reference to the attached drawings.

DESCRIPTION OF THE EMBODIMENTS

Preferred embodiments of the present invention will be described in detail below with reference to the accompanying drawings. The following embodiments do not limit the claims of the present invention, and not all combinations of features described in the embodiments are essential to solving means of the present invention.

[First Embodiment]

Figure 1:
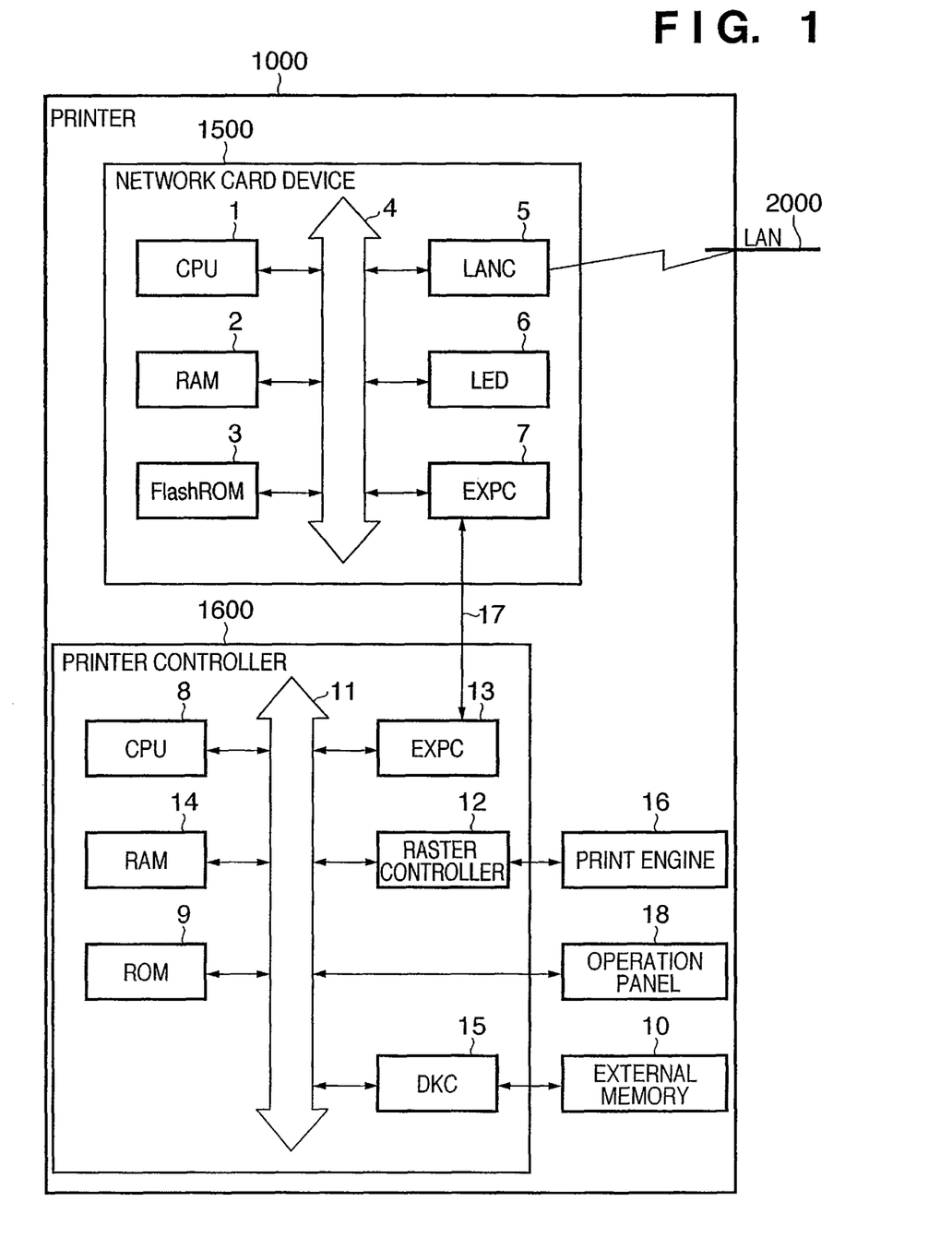
FIG. 1 is a block diagram showing the hardware configuration of a printing apparatus (printer) 1000 as a preferred application of a data processing apparatus according to the present invention.

FIG. 1 is a block diagram showing the hardware configuration of a printing apparatus (printer) 1000 as a preferred application of a data processing apparatus according to the present invention.

FIG. 1 does not illustrate a hardware configuration other than partial hardware used in the following description. That is, FIG. 1 shows a network card device 1500 as a preferred application of a communication control apparatus according to the invention, and a printer controller 1600 in the main body of the printing apparatus 1000. The network card device 1500 can be mounted/dismounted to/from the printing apparatus 1000.

The network card device 1500 will be explained. A CPU 1 controls the operations of units connected to a system bus 4 by using programs and data stored in a flash ROM (FlashROM) 3 serving as a flash memory.

Figure 5:
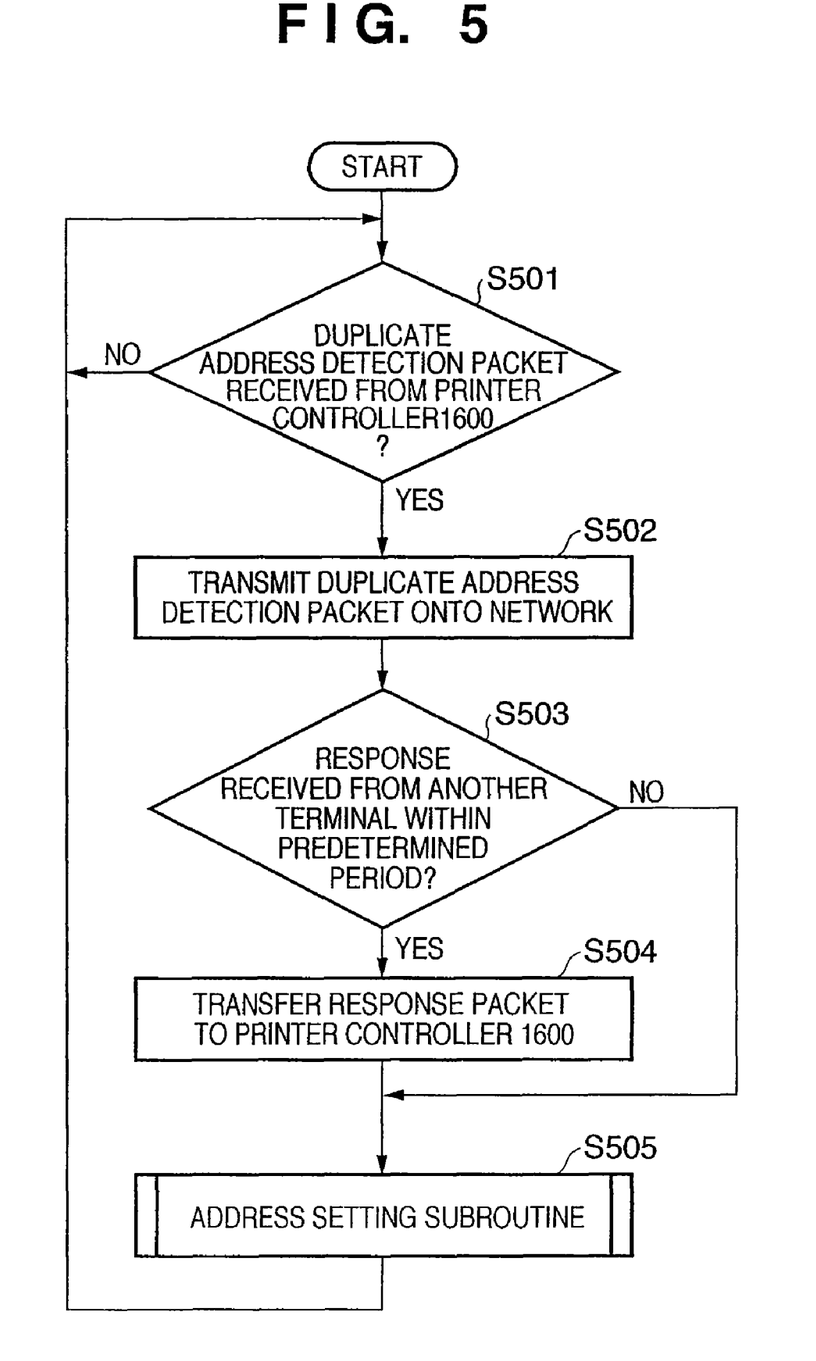
FIG. 5 is a flowchart of an address setting process executed by a network card device 1500.
Figure 6:
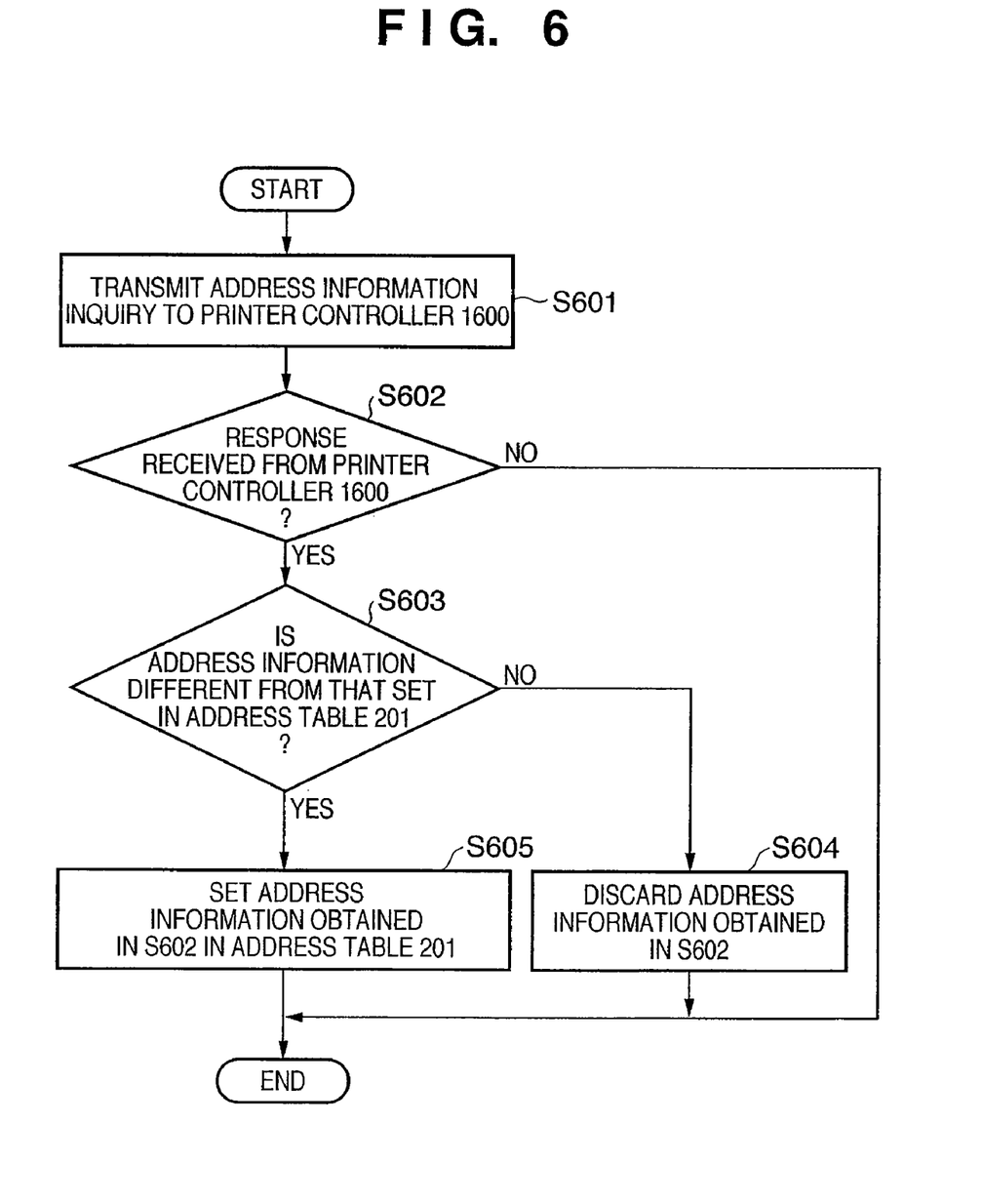
FIG. 6 is a flowchart showing details of a process in step S505.
Figure 7:
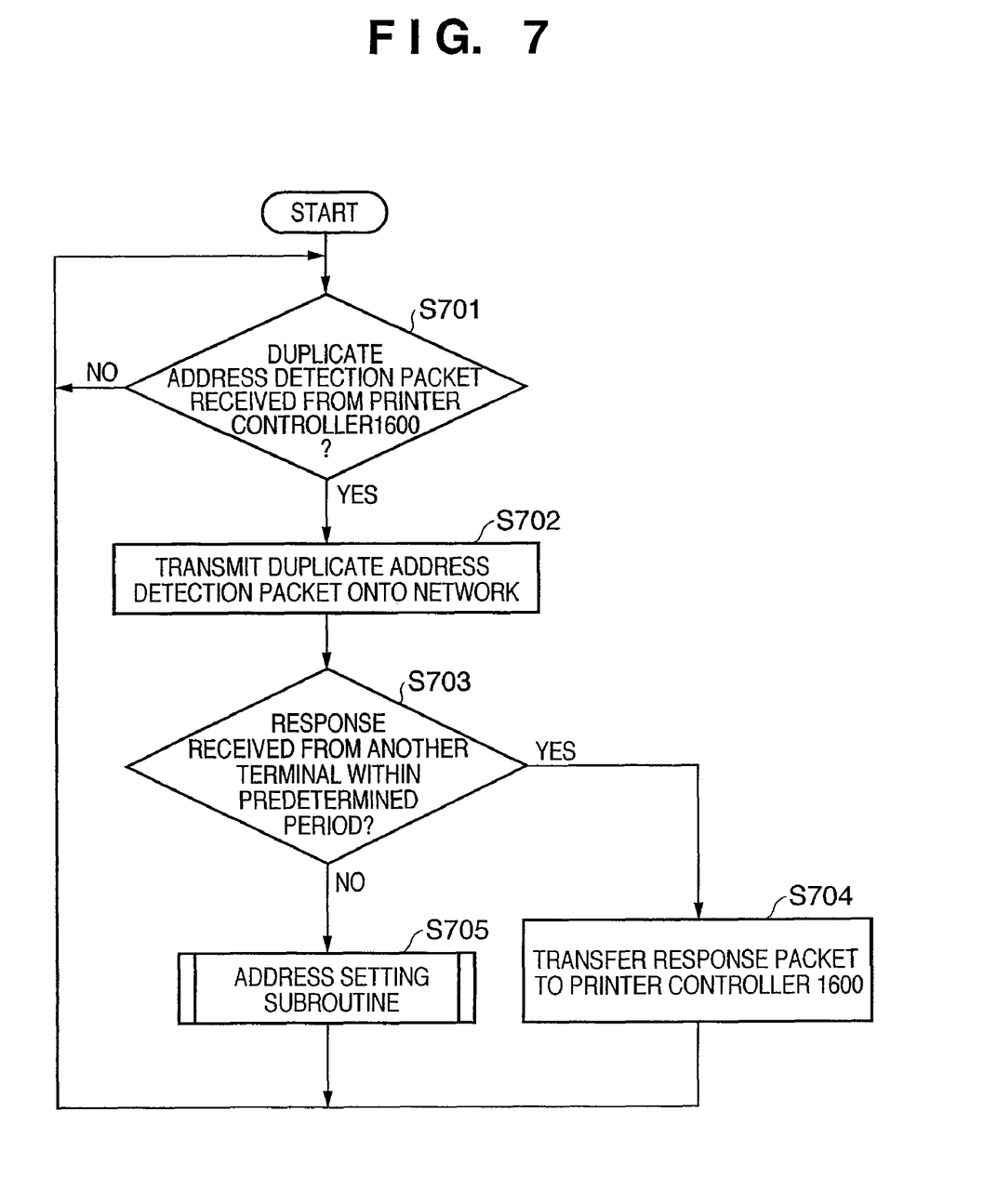
FIG. 7 is a flowchart of another address setting process executed by the network card device 1500.

The flash ROM 3 stores programs and data for causing the CPU 1 to execute processes according to flowcharts shown in FIGS. 5 to 7. The flash ROM 3 also stores an MIB (Management Information Base) client program. The MIB client program communicates via an expansion interface 17 with an MIB agent program stored in the printer controller 1600, and obtains setting information on the printer 1000.

By using a predetermined network communication protocol, a network controller (LANC) 5 communicates with a plurality of external apparatuses (not shown) such as a host computer connected to a local area network (LAN) 2000. More specifically, the LANC 5 performs a transmission/reception process to receive a variety of data such as print data and a printer control instruction transmitted from an external apparatus on the LAN 2000.

An expansion interface controller (EXPC) 7 transmits/receives data with the printer controller 1600 connected via the expansion interface 17. For example, the EXPC 7 receives print data, which is received from an external apparatus by the LANC 5, and transmits it to the printer controller 1600.

A RAM 2 has a work area used when the CPU 1 executes various processes, and an area for temporarily storing various data. For example, the RAM 2 stores a network address table 201 shown in FIG. 2.

Figure 2:
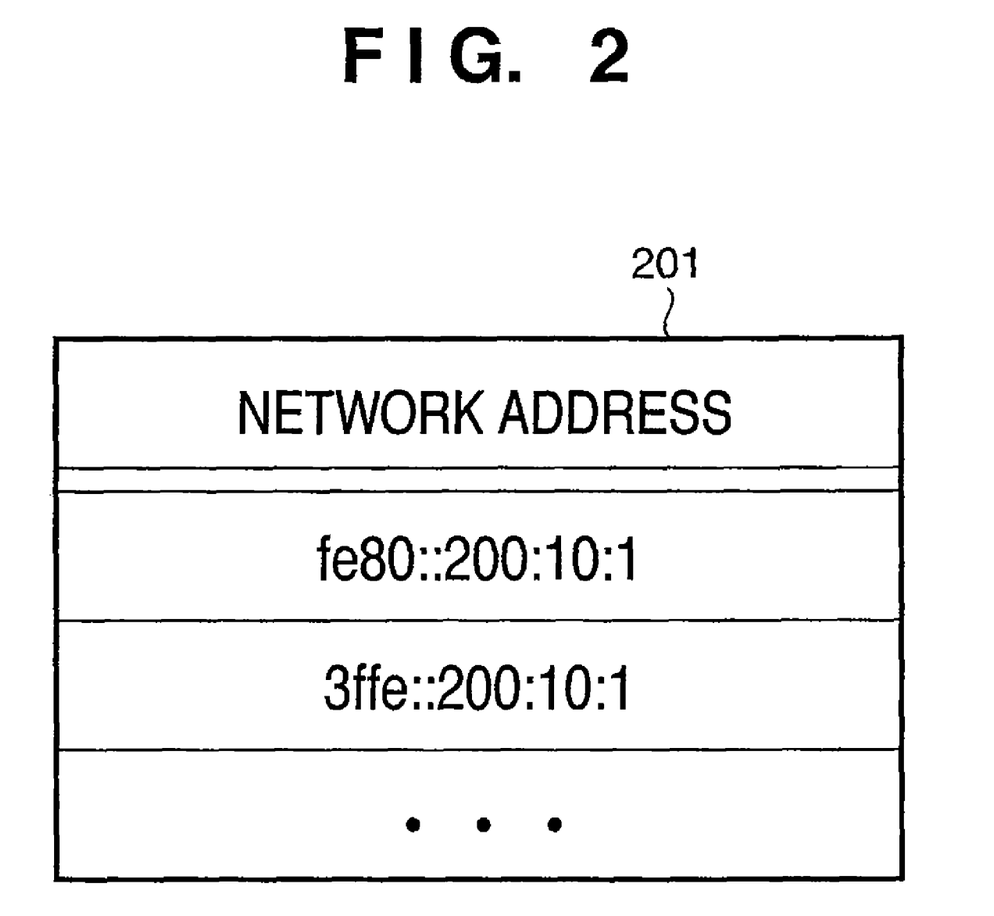
FIG. 2 is a table showing an example of structure of a network address table 201.

FIG. 2 is a table showing an example of structure of the network address table 201. As shown in FIG. 2, the network address table 201 holds a plurality of network addresses. All these network addresses are assigned to the network card device 1500. The network card device 1500 can use each network address registered in the network address table 201 shown in FIG. 2 to communicate data with an external apparatus. In the example of FIG. 2, the network address table 201 holds two network addresses "fe80::200:10:1" and "3ffe::200:10:1". By using these two network addresses, the network card device 1500 can communicate with an external apparatus on the LAN 2000.

An LED 6 is used as a display unit for representing the operation state of the network card device 1500. For example, the flashing pattern or color of the LED 6 can display various operation states such as the electrical connection state (LINK) between the LANC 5 and the LAN 2000 and a network communication mode (10 Base, 100 Base, full duplex, or half duplex).

The expansion interface 17 which connects the network card device 1500 to the printer controller 1600 is formed from a connector (not shown), and disconnects only the network card device 1500. Thus, the network card device 1500 is also mountable in another printer 1000 having the same arrangement.

The printer controller 1600 will be explained. A CPU 8 controls the operations of units connected to a system bus 11 by using programs and data stored in a RAM 14, ROM 9, and external memory 10, and data received via an expansion interface controller (EXPC) 13.

The external memory 10 also stores a database (MIB) describing setting information on the printer 1000, and a program (MIB agent program) for implementing the MIB agent function. Upon receiving an inquiry from the MIB client program, the MIB agent program sends back information (setting information of the printer 1000) corresponding to the inquiry among pieces of information registered in the database.

A disk controller (DKC) 15 controls access to the external memory 10 in order to write information in the external memory 10 and read out information from it.

The expansion interface controller 13 communicates data with the EXPC 7 of the network card device 1500 via the interface 17. For example, the expansion interface controller 13 receives print data supplied from the EXPC 7. A raster controller 12 generates image information on the basis of the print data, and outputs an image signal based on the generated image information to a print engine 16.

The RAM 14 functioning as the main memory and work memory of the CPU 8 and the like can be expanded its own memory capacity by an optional RAM connected to an expansion port (not shown). The RAM 14 stores a network address table 301 shown in FIG. 3.

Figure 3:
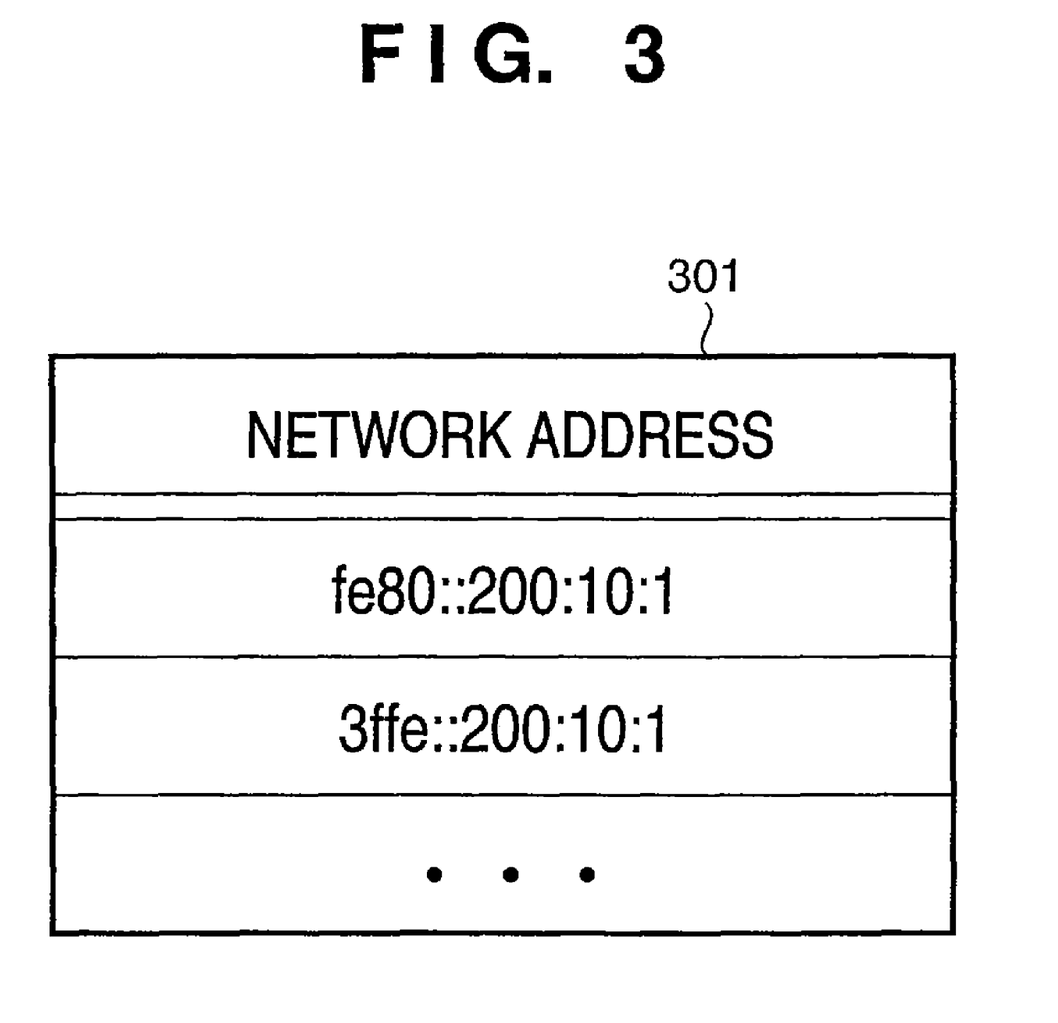
FIG. 3 is a table showing an example of structure of a network address table 301.

FIG. 3 is a table showing an example of structure of the network address table 301. As shown in FIG. 3, the network address table 301 holds a plurality of network addresses. All these network addresses are assigned to the printer controller 1600. The printer controller 1600 can use each network address registered in the network address table 301 shown in FIG. 3 to communicate data with an external apparatus via the network card device 1500. In the example of FIG. 3, the network address table 301 holds two network addresses "fe80::200:10:1" and "3ffe::200:10:1". By using these two network addresses, the printer controller 1600 can communicate with an external apparatus on the LAN 2000 via the network card device 1500.

The CPU 8 properly reflects, in the database (MIB) stored in the external memory 10, network address information registered in the network address table 301. When the MIB client program sends an inquiry to the MIB agent program, the MIB agent program can obtain network address information representing network addresses registered in the network address table 301.

An operation panel (operation unit) 18 has buttons for operations such as setting of the operation mode of the printer 1000 and the like and cancellation of print data, and a display unit such as a liquid crystal panel or LED representing the operation state of the printer 1000.

Using a known printing technique, the print engine 16 prints on the basis of print data received by the EXPC 13. Preferable examples of the printing technique are electrophotographic printing (laser beam printing), inkjet printing, and sublimation (thermal transfer) printing.

A duplicate address detection (DAD) function used in the following process will be described.

The duplicate address detection function is newly added by the IPv6 protocol. This function is to confirm whether another terminal on the same link is already using an IPv6 address when the IPv6 address is added. Duplicate address detection is defined by RFC 2462.

When an apparatus having the IPv6 protocol newly generates an IPv6 address, it transmits an NS (Neighbor Solicitation) message containing the newly generated IPv6 address to all terminals on the same link. Upon receiving the NS message, each terminal determines whether it is already using the IPv6 address contained in the message. If the terminal is not using the IPv6 address, it discards the message. If the terminal is already using the IPv6 address, it sends back an NA (Neighbor Advertisement) message in order to represent address duplication.

The NS message-transmitting apparatus waits for a predetermined period for an NA message in response to the NS message. If the apparatus has not received any response, it determines that the IPv6 address is not a duplicate address. The apparatus starts formally using the IPv6 address as its address. If the apparatus has received an NA message within a predetermined period, it cancels the use of the IPv6 address in order to avoid address duplication.

When a given apparatus transmits an NS message for duplicate address detection, it can be determined that the apparatus is trying to use a new IPv6 address contained in the NS message.

Figure 4:
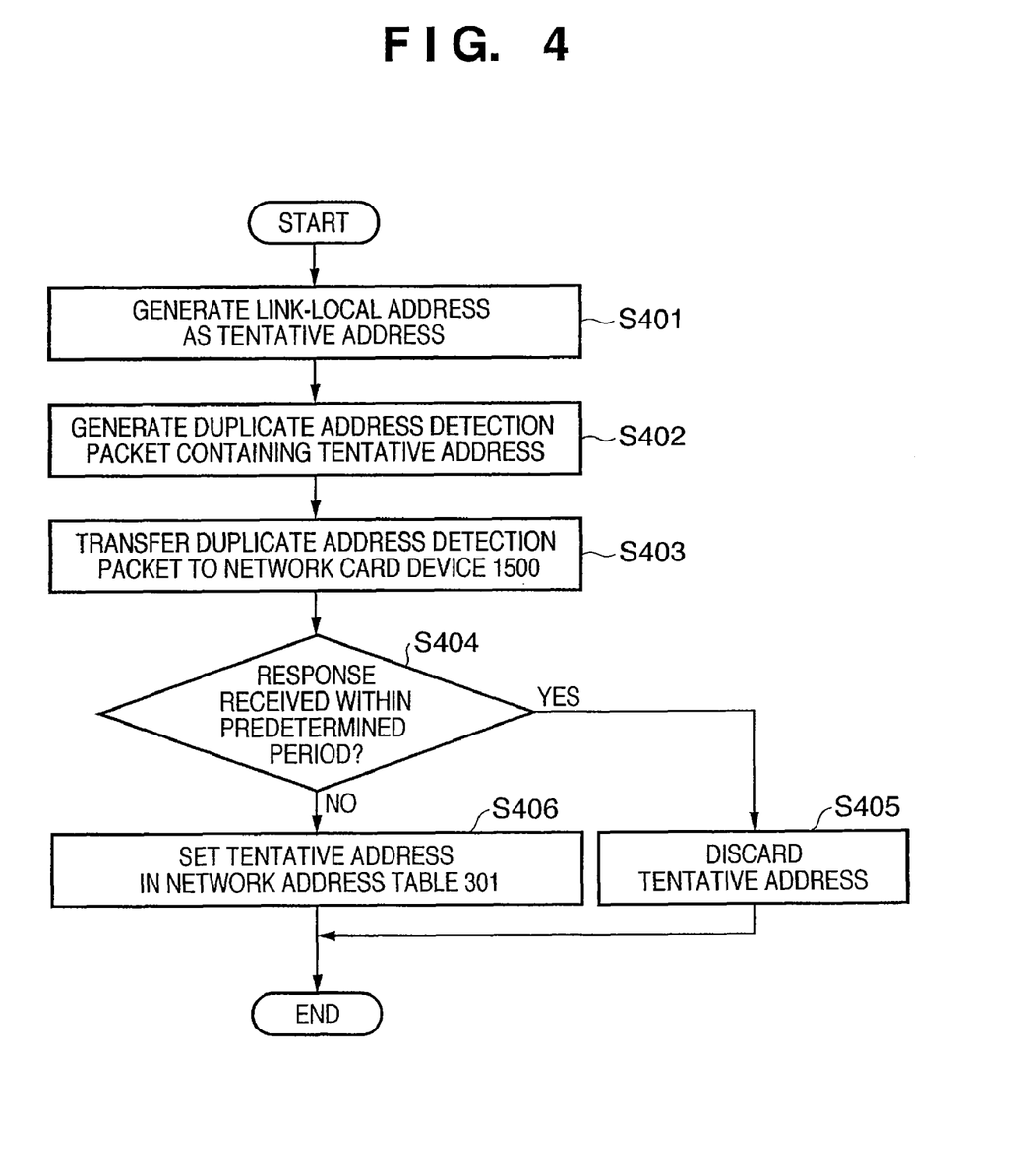
FIG. 4 is a flowchart of a duplicate address detection process executed by a printer controller 1600.

FIG. 4 is a flowchart of a duplicate address detection process executed by the printer controller 1600. The printer controller 1600 performs the duplicate address detection process in the following cases:
the case where a link-local address is generated upon startup.
the case where the DHCP server assigns an IPv6 address.
the case where an IPv6 address is generated on the basis of an advertisement from the router.
the case where the user of the printer 1000 manually registers an IPv6 address via the operation panel 18 or the like.

As is apparent from these cases, every time the printer controller 1600 is to use any IPv6 address, it performs the duplicate address detection process. A duplicate address detection process when the printer controller 1600 generates a link-local address upon start-up will be exemplified.

The external memory 10 or ROM 9 stores programs and data for causing the printer controller 1600 to execute a process according to the flowchart shown in FIG. 4. By using the programs and data, the CPU 8 controls the operations of units of the printer controller 1600. The printer controller 1600 executes each process to be described below.

When the CPU 8 detects power-on of the printer 1000, it automatically generates, as a tentative network address in step S401, a link-local address which is a combination of a specific network prefix and an interface identifier. The link-local address is defined by RFC 2373. In a duplicate address detection process performed when the user of the printer 1000 manually registers an IPv6 address, the CPU 8 obtains the IPv6 address input by the user in step S401, instead of generating a tentative network address.

In step S402, the CPU 8 generates a duplicate address detection packet containing the tentative network address generated in step S401. The duplicate address detection packet corresponds to an NS message.

In step S403, the CPU 8 controls the EXPC 13, and the EXPC 13 transfers the duplicate address detection packet generated in step S402 to the network card device 1500 via the expansion interface 17.

The duplicate address detection packet is broadcast to an external apparatus such as a host computer (not shown) connected on the LAN 2000 via the network card device 1500. The broadcast process by the network card device 1500 will be described later.

As described above, upon receiving the duplicate address detection packet, the external apparatus determines whether it is already using the tentative network address contained in the duplicate address detection packet. If the external apparatus is not using the tentative network address, it discards the duplicate address detection packet. If the external apparatus is already using the tentative network address, it sends back an NA message in order to represent that the tentative network address is a duplicate address.

In step S404, the CPU 8 checks whether it has received an NA message from an external apparatus via the network card device 1500 within a predetermined period. As a result of the check, if the CPU 8 has received the NA message within the predetermined period, this is, if the CPU 8 has received the NA message representing that the tentative network address is a duplicate address, the process advances to step S405. If the CPU 8 has not received any NA message within the predetermined period, this is, if the external apparatus discards the duplicate address detection packet, the process advances to step S406.

Receiving the NA message means that the tentative network address generated by the printer controller 1600 is already in use by another apparatus on the network. Thus, in step S405, the CPU 8 discards the tentative network address after receiving the NA message from the network card device 1500. Then, the process according to the flowchart ends.

Receiving no advertisement within the predetermined period means that no NA message is received, and that the tentative network address generated by the printer controller 1600 is not a duplicate address. Thus, in step S406, the CPU 8 registers (sets) the tentative network address (IPv6 address) in the network address table 301. Then, the process according to the flowchart ends. The CPU 1 reflects the network address table 301 updated in this step in the MIB at a proper timing.

By the above-described process, the IPv6 address serving as a tentative network address is set in the network address table 301. After that, the printer controller 1600 can communicate by using the tentative network address.

FIG. 5 is a flowchart of an address setting process executed by the network card device 1500. More specifically, the network card device 1500 performs the process according to the flowchart in FIG. 5 when the printer controller 1600 executes the process according to the flowchart shown in FIG. 4.

The flash ROM 3 stores programs and data for causing the network card device 1500 to execute the process according to the flowchart in FIG. 5. By using the programs and data, the CPU 1 controls the operations of units of the network card device 1500. The network card device 1500 executes each process to be described below.

In step S501, the CPU 1 checks whether the printer controller 1600 has sent a duplicate address detection packet in step S403. If the CPU 1 detects from the check that it has received a duplicate address detection packet from the printer controller 1600 via the expansion interface 17 and EXPC 7, the process advances to step S502; if NO, returns to step S501.

In step S502, the CPU 1 controls the LANC 5, and the LANC 5 broadcasts the duplicate address detection packet onto the LAN 2000. The destination is an external apparatus such as a host computer (not shown) connected on the LAN 2000.

In step S503, the CPU 1 checks whether it has received an NA message from an external apparatus within a predetermined period. If the CPU 1 has received an advertisement within the predetermined period as a result of the check, i.e., an NA message representing that the tentative network address is a duplicate address, the process advances to step S504. If the CPU 1 has not received any NA message within the predetermined period, i.e., the external apparatus discards the duplicate address detection packet, the process advances to step S505.

In step S504, the CPU 1 transfers the NA message to the printer controller 1600 via the EXPC 7.

In step S505, the CPU 1 performs the process of an address setting subroutine to be described later. The process in step S505 will be explained with reference to FIG. 6.

Then, the process returns to step S501, and the CPU 1 waits again for a duplicate address detection packet from the printer controller 1600. After that, the network card device 1500 repeats the processes in steps S501 to S505 till power-off.

FIG. 6 is a flowchart showing details of the process in step S505.

In step S601, the CPU 1 inquires network address information of the MIB agent program of the printer controller 1600 by using the MIB client program stored in the flash ROM 3.

Upon receiving the inquiry, the MIB agent program of the printer controller 1600 reads out network address information from the database (MIB). The MIB agent program sends back the readout network address information to the network card device 1500. Note that network address information registered in the database synchronizes with the network address table 301, and is identical to information registered in the network address table 301.

In step S602, the CPU 1 waits for reception of network address information from the printer controller 1600. If the printer controller 1600 transmits network address information, the CPU 1 receives it, and the process advances to step S603. If the CPU 1 cannot receive network address information from the printer controller 1600 due to any reason, the process according to the flowchart ends.

In step S603, the CPU 1 compares one or a plurality of network addresses registered in the network address table 201 stored in the RAM 2 with one or a plurality of network addresses represented by the network address information received in step S602. That is, the CPU 1 checks whether the tables shown in FIGS. 2 and 3 are different each other.

If these tables are different as a result of the check, the process advances to step S605; if they are identical, to step S604. In step S604, the CPU 1 discards the network address information received in step S602, and the process according to the flowchart ends.

In step S605, the CPU 1 registers, in the network address table 201, one or a plurality of network addresses represented by the network address information received in step S602. It is also possible to skip steps S603 and S604 and always perform the process in step S605 when the printer controller 1600 transmits network address information.

Thereafter, the network card device 1500 can communicate with an external apparatus on the LAN 2000 by using the same network address as that currently set in the printer controller 1600.

By the above-described process according to the first embodiment, a duplicate address detection packet transferred from the printer controller 1600 triggers the network card device 1500 to inquire network address information of the printer controller 1600.

The first embodiment can provide an efficient inquiry method with small work loads on both the network card device 1500 and printer controller 1600, compared to inquiring network address information every predetermined period.

[Second Embodiment]

The second embodiment is different from the first embodiment only in that a network card device 1500 performs a process according to the flowchart shown in FIG. 7, instead of the process according to the flowchart shown in FIG. 5.

The process according to the flowchart in FIG. 7 will be explained.

In step S701, a CPU 1 checks whether a printer controller 1600 has sent a duplicate address detection packet in step S403. If the CPU 1 detects from the check that the printer controller 1600 has sent a duplicate address detection packet via an expansion interface 17 and EXPC 7, the process advances to step S702; if NO, returns to step S701.

In step S702, the CPU 1 controls a LANC 5, and the LANC 5 broadcasts the duplicate address detection packet onto a LAN 2000. The destination is an external apparatus such as a host computer (not shown) connected on the LAN 2000.

In step S703, the CPU 1 checks whether it has received an NA message from an external apparatus within a predetermined period. As a result of the check, if the CPU 1 has received the NA message within the predetermined period, this is, if the CPU 1 has received the NA message representing that the tentative network address is a duplicate address, the process advances to step S704. If the CPU 1 has not received any NA message within the predetermined period, this is, if the external apparatus discards the duplicate address detection packet, the process advances to step S705.

In step S704, the CPU 1 transfers the NA message to the printer controller 1600 via the EXPC 7. Then, the process according to the flowchart ends. More specifically, when an NA message representing that the tentative network address is a duplicate address is received, it can be determined that the setting contents of addresses used by the printer controller 1600 do not change. Thus, the network card device 1500 does not execute any address setting process. The process returns to step S701, and the CPU 1 waits again for a duplicate address detection packet from the printer controller 1600. Thereafter, the network card device 1500 repeats the processes in steps S701 to S705 till power-off.

In step S705, the CPU 1 performs the same process as step S505. The process returns to step S701, and the CPU 1 waits again for a duplicate address detection packet from the printer controller 1600. The network card device 1500 repeats the processes in steps S701 to S705 till power-off.

As described above, the network card device 1500 according to the second embodiment transmits a duplicate address detection packet from the printer controller 1600 onto the network, and waits for a response from an apparatus on the network for a predetermined period. If the network card device 1500 receives a response, i.e., detects address duplication, it determines that the setting contents of addresses in the printer controller 1600 do not change. The network card device 1500 does not inquire any address information of the printer controller 1600.

Only when the network card device 1500 does not receive any response, i.e., does not detect address duplication, it inquires address information of the printer controller 1600.

This process can more reliably avoid a situation in which the network card device 1500 inquires address information at the timing when the setting contents of addresses in the printer controller 1600 do not change. In other words, the frequency that the address setting subroutine is executed can be further decreased.

[Third Embodiment]

In the first and second embodiments, the network card device 1500 may be a separate device physically disconnected from the printer 1000. In this case, the printer 1000 incorporates a control unit which manages the control system formed from the printer controller 1600.

In the network card device 1500, the expansion interface controller (EXPC) 7 shown in FIG. 1 may be the second network controller connected to the system bus 4.

In the printer controller 1600, the expansion interface controller (EXPC) 13 shown in FIG. 1 may be a network controller connected to the system bus 11. In this case, the expansion interface 17 is the second local area network. Further, both the network card device 1500 and the printer controller 1600 are connected to the second local area network.

The present invention includes a case where a software program for implementing the functions of the above-described embodiments is supplied to a system or apparatus directly or from a remote place. The present invention also includes a case where a computer of the system or the apparatus reads out and executes the supplied program codes. In this case, the form of the invention is not limited to the program as long as a program function is attained. The present invention is therefore implemented by program codes installed in the computer in order to implement functional processes of the present invention by the computer. That is, the present invention also includes a computer program for implementing functional processes of the present invention. In this case, the form of the program is arbitrary such as an object code, a program executed by an interpreter, or script data supplied to an OS as long as a program function is attained.

A storage medium for supplying the program includes a floppy® disk, hard disk, optical disk, magnetooptical disk, MO, CD-ROM, CD-R, and CD-RW. In addition, the storage medium includes a magnetic tape, nonvolatile memory card, ROM, and DVD (DVD-ROM and DVD-R). As another program supply method, the program can also be supplied by connecting a client computer to an Internet homepage via the browser of the client computer. In this case, the computer program of the present invention or a compressed file containing an automatic installing function is downloaded from the homepage to a storage medium such as a hard disk. The program can also be implemented by grouping program codes which form the program of the present invention into a plurality of files, and downloading the files from different homepages. That is, the claims of the present invention also incorporate a WWW server which allows a plurality of users to download the program files for implementing functional processes of the present invention by a computer.

The program of the present invention can also be encrypted, stored in a storage medium such as a CD-ROM, and distributed to a user. A user who satisfies predetermined conditions is prompted to download decryption key information from a homepage via the Internet. The user can execute the encrypted program by using the key information, and install the program in the computer.

The functions of the above-described embodiments can also be implemented when an OS or the like running on the computer performs some or all of actual processes on the basis of the instructions of the program read out by the computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-207174, filed Jul. 28, 2006 which is hereby incorporated by reference herein in its entirety.

What is claimed is:

1. A communication control apparatus communicatable with an external apparatus via a network, comprising:
   a holding unit configured to hold a network address which is assigned to the communication control apparatus and used in communicating with the external apparatus via the network;
   a first communicating unit configured to communicate with a controller;
   a second communicating unit configured to communicate with the external apparatus via the network; and
   a processing unit (a) configured to control, if the first communicating unit receives from the controller confirming data which includes a specific network address to be assigned to the controller and is transmitted via the network in order to confirm whether the external apparatus is using the specific network address, the second communicating unit to transmit the confirming data via the network, (b) configured to control, if the first communicating unit receives from the controller the confirming data, the first communicating unit to transmit to the controller a request for the specific network address assigned to the controller, and (c) configured to register, if the first communicating unit receives from the controller the specific network address which is assigned to the controller and is transmitted by the controller in response to the request, the received specific network address as the network address assigned to the communication control apparatus into the holding unit.

2. The apparatus according to claim 1, further comprising:
   a comparison unit configured to compare the network address held by the holding unit with the specific network address which is transmitted by the controller in response to the request and is received by the first communicating unit,
   wherein when the held network addresses does not match with the received specific network address as a result of comparison by the comparison unit, the processing unit registers, into the holding unit, the specific network address which is transmitted by the controller in response to the request and is received by the first communicating unit.

3. The apparatus according to claim 1, wherein if the first communicating unit receives the confirming data from the controller and the second communicating unit does not receive from the external apparatus response data representing that the external apparatus is using the specific network address included in the confirming data, the processing unit controls the first communicating unit to transmit the request to the controller.

4. The apparatus according to claim 3, wherein if the first communicating unit receives the confirming data from the controller and the second communicating unit receive from the external apparatus the response data, the processing unit does not control the first communication unit to transmit the request to the controller.

5. The apparatus according to claim 3, wherein if the first communicating unit receives the confirming data from the controller and the second communicating unit does not receive from the external apparatus the response data within a predetermined period, the processing unit controls the first communicating unit to transmit the request to the controller.

6. The apparatus according to claim 1, wherein the processing unit control the first communicating unit to transmit to the controller the request after it is determined, using the confirm data, that the external apparatus is not using the specific network address.

7. The apparatus according to claim 1, wherein the specific network address is IP version 6 address.

8. The apparatus according to claim 1, wherein the confirming data is a neighbor solicitation message.

9. The apparatus according to claim 8, wherein the external apparatus which is using the specific network address included in the neighbor solicitation message sends a neighbor advertisement message in response to the neighbor solicitation message.

10. A data processing apparatus including a communication control apparatus and a controller, wherein,
the communication control apparatus comprises:
a first holding unit configured to hold a network address which is assigned to the communication control apparatus and used in communicating with an external apparatus via a network;
a first communicating unit configured to communicate with the controller;
a second communicating unit configured to communicate with the external apparatus via the network; and
a first processing unit (a) configured to control, if the first communicating unit receives from the controller confirming data which includes a specific network address to be assigned to the controller and is transmitted via the network in order to confirm whether the external apparatus is using the specific network address, the second communicating unit to transmit the confirming data via the network, (b) configured to control, if the first communicating unit receives from the controller the confirming data, the first communicating unit to transmit to the controller a request for the specific network address assigned to the controller, and (c) configured to register, if the first communicating unit receives from the controller the specific network address which is assigned to the controller and is transmitted by the controller in response to the request, the received specific network address as the network address assigned to the communication control apparatus into the first holding unit, and
the controller comprises:
a second holding unit configured to hold a network address which is assigned to the controller and used in communicating with the external apparatus via the network;
a third communicating unit configured to communicate with the communication control apparatus;
a second processing unit (d) configured to control the third communicating unit to transmit the confirming data to the communication control apparatus, (e) configured to register, if the third communicating unit does not receive from the communication control apparatus response data representing that the external apparatus is using the specific network address included in the confirming data, the specific network address included in the confirming data as the network address assigned to the controller into the second holding unit, and (f) configured to control, if the third communicating unit receives the request from the communication control apparatus, the third communicating unit to transmit the specific network address held by the second holding unit to the controller, wherein the second processing unit does not register the specific network address included in the confirming data into the second holding unit if the third communicating unit receives the response data from the communication control apparatus.

11. The system according to claim 10, wherein the second processing unit discards the specific network address included in the confirming data if the third communicating unit receives the response data from the communication control apparatus.

12. A method of controlling a communication control apparatus communicatable with an external apparatus via a network, comprising:
a first receiving step of receiving, from a controller, confirming data which includes a specific network address to be assigned to the controller and is transmitted via the network in order to confirm whether the external apparatus is using the specific network address;
a first transmitting step of transmitting the confirming data via the network;
a request step of transmitting, to the controller, a request for the specific network address assigned to the controller upon receiving, from the controller, the confirming data;
a second receiving step of receiving, from the controller, the specific network address transmitted by the controller in response to the request; and
a registration step of registering the received specific network address, as a network address which is assigned to the communication control apparatus and used in communicating with the external apparatus via the network.

13. The method according to claim 12, further comprising:
a comparison step of comparing the network address assigned to the communication control apparatus with the received specific network address,
wherein when the held network address do not match with the received specific network address as a result of comparison in the comparison step, the received specific network address is registered as the network address assigned to the communication control apparatus.

14. The method according to claim 12, further comprising:
a third receiving step of receiving, via the network, response data representing that the external apparatus is using the specific network address included in the confirming data; and
a second transmitting step of, if the response data received in the third receiving step, transmitting the response data to the controller,
wherein, if the confirming data is received in the first receiving step and the response data is not received, the request is transmitted in the request step.

15. A computer program stored in a non-transitory storage medium, the computer program causing a computer of a communication control apparatus including a first communicating unit configured to communicate with a controller and a second communicating unit configured to communicate with an external apparatus via a network to:
control, if the first communicating unit receives from a controller confirming data which includes a specific network address to be assigned to the controller and is transmitted via a network in order to confirm whether an external apparatus is using the specific network address, the second communicating unit to transmit the confirming data via the network;

control, if the first communicating unit receives from the controller the confirming data, the first communicating unit to transmit to the controller a request for the specific network address assigned to the controller; and register, if the first communicating unit receives from the controller the specific network address which is assigned to the controller and is transmitted by the controller in response to the request, the received specific network address as a network address assigned to the communication control apparatus.

* * * * *